United States Patent
Breed

[15] 3,701,372
[45] Oct. 31, 1972

[54] LOCK BOLT AND METHOD OF MAKING THE SAME

[72] Inventor: Arthur R. Breed, Euclid, Ohio

[73] Assignee: The Lamson & Sessions Co., Cleveland, Ohio

[22] Filed: Sept. 4, 1970

[21] Appl. No.: 69,811

Related U.S. Application Data

[63] Continuation of Ser. No. 716,219, March 26, 1968, abandoned, which is a continuation-in-part of Ser. No. 629,133, April 7, 1967, Pat. No. 3,526,914.

[52] U.S. Cl..............................................151/22
[51] Int. Cl...........................................F16b 39/30
[58] Field of Search ..................151/22, 14; 80/46

[56] References Cited

UNITED STATES PATENTS

| 341,145 | 5/1886 | Howes | 151/22 |
| 2,371,365 | 3/1945 | Tomalis et al. | 151/22 |
| 3,412,773 | 11/1968 | Breed | 151/22 |

Primary Examiner—Edward C. Allen
Attorney—Yount and Tarolli

[57] ABSTRACT

An external locking thread convolution is provided which deviates from a standard Class 5 interference-fit thread in that the space provided at the root of the thread form between adjacent locking threads is greater than the maximum space provided at this location for the standard class 5 thread. Also, an externally threaded locking fastener having such a locking thread convolution and a method for making such a locking fastener by a thread rolling operation is provided.

8 Claims, 8 Drawing Figures

PATENTED OCT 31 1972 3,701,372

LOCK BOLT AND METHOD OF MAKING THE SAME

This application is a continuation of application Ser. No. 716,219, filed Mar. 26, 1968, now abandoned, which is itself a continuation-in-part of application Ser. No. 629,133, filed Apr. 7, 1967, now U.S. Pat. No. 3,526,914.

The present invention relates to an external locking thread convolution, and more particularly to an externally threaded locking fastener having such a locking thread convolution thereon which interferes with a mating internal thread on an internally threaded member when applied thereto. The present present invention relates relates to a method of making such an externally threaded locking fastener.

Figure 1:
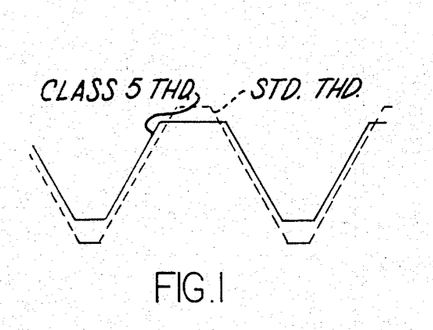
FIG. 1 is a schematic view illustrating the differences between a standard thread profile of the theoretical basic form and a standard Class 5 thread profile.
Figure 2:
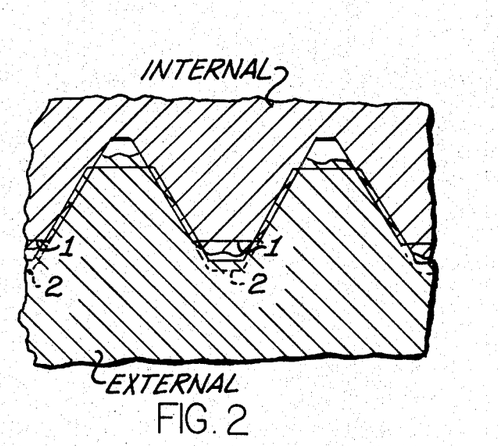
FIG. 2 is a fragmentary axial cross-sectional view of a stud and an internally threaded member illustrating the present day practice for Class 5 interference-fit threads.

In accordance with present day practice, to provide a thread flank interference-fit with an internally threaded member having threads of standard internal thread dimensions including pitch diameters, the mating externally threaded member is usually provided with a standard Class 5 interference-fit thread. The standard Class 5 external thread has a pitch diameter which is greater than the maximum pitch diameter for a standard thread, such as a Class 2A thread, derived from the same theoretical basic thread form so as to provide a flank pitch line width which is greater than that for the standard thread and a major diameter which is less than the minimum major diameter of the standard thread in order to provide sufficient clearance space between the crests of the external threads and the root of the internal threads to accommodate any metal which is swaged and/or to provide sufficient clearance space to enable the major diameter of the external thread to increase due to plastic and/or elastic flow. The standard Class 5 external thread also has a minor diameter which is equal to or greater than the maximum minor diameter of the standard thread of the same theoretical basic thread form. The differences between a standard thread and the standard Class 5 thread is schematically illustrated in FIG. 1 wherein a standard thread profile is shown in dotted lines and a Class 5 thread profile is shown in solid lines. FIG. 2 illustrates present day Class 5 interference-fit thread practice and with the interference between the external and internal threads being indicated in exaggerated form by the double cross-hatched areas.

To avoid crest interference between the crests of the internally threaded member and the root of the Class 5 threads of the externally threaded member, the threads of the internally threaded member, in accordance with present day practice, are further truncated, i.e., provided with the minor diameter which is greater than the maximum minor diameter for the standard thread, as respectively indicated by the solid and dotted lines 1 and 2 in FIG. 2, in order to provide sufficient clearance space between the crests of the internal threads and the root of the Class 5 external threads to accommodate any metal swaged and/or to freely allow for any decrease in the minor diameter of the internal threads due to plastic and/or elastic flow due to the thread interference.

Although the above described present day interference-fit practice has been satisfactory in operation, it has been unsatisfactory from a cost standpoint in that it requires alteration of both the internal and external mating threads, since both threads have to be truncated to a greater extent than that of the standard thread in order to provide for sufficient clearance space to freely accommodate any metal which is swaged. Moreover, the present day standard Class 5 external thread cannot be used with a present day standard mating internal thread, (i.e. UNC or UNF Class 2B, or Class 3B).

Accordingly, it is an important object of the present invention to provide a new and improved external locking thread convolution which is adapted to interfere with the flanks of a present day standard mating internal thread, and which locking thread convolution has a flank width in an axial plane which is wider than that for the standard thread of the same theoretical basic thread form, preferably a flank width within the Class 5 standards, to provide a thread flank interferance-fit when applied to a standard internal mating thread and which has a configuration in an axial plane such that sufficient recess or clearance space between the crests of the locking threads and the root of the standard internal threads and the crests of the standard internal threads and the root of the external threads is provided to freely accommodate any metal swaged due to the thread interference, and to provide space for a decreased internal thread minor diameter due to plastic and/or elastic flow of material due to the thread interference.

The present invention further provides a new and improved external locking thread convolution which has a thread angle which is the same as that of the theoretical basic thread form, a metal thickness between the flanks which is wider than that for the basic thread form, preferably having a width such that the pitch diameter cylinder is within the tolerance limitations of the Class 5 thread standards, to provide for uniform thread interference along the flanks of the external locking thread convolution when the latter is applied to a mating standard internal thread, a recess space between adjacent threads thereof which is larger in an axial plane than that defined by the triangle between the flanks of the adjacent threads of the external locking thread convolution to freely accommodate metal swaged due to the thread interference so that seizure between the locking thread convolution and the mating thread does not occur, and a major diameter which is less than the minimum major diameter of the standard thread convolution of the same theoretical basic thread form to provide sufficient clearance space between the crests of the external locking thread and the root of the mating internal thread to freely accommodate any metal swaged due to the thread interference so that seizure between the locking thread convolution and the mating thread does not occur.

The present invention also provides a new and improved external locking thread convolution of the character described wherein the bottom of the recess has a continuous arcuate cross sectional configuration.

Th present invention further provides a new and improved external locking thread convolution of the character described wherein the bottom of the recess is filleted to provide smooth continuous intersections between the bottom and generally radially extending sidewall portions of said recess to thereby minimize stress concentrations in the thread of the externally threaded member.

The present invention also provides a new and improved external locking convolution of the character described and in which the recess space between the adjacent threads of the external locking thread convolution preferably extends to a depth greater than the maximum depth for the standard thread of the same basic thread form and preferably deeper than the sharp root of the basic thread form.

The present invention additionally provides a new and improved external locking thread convolution of the character referred to and in which the recess space between the adjacent threads has a generally radially extending wall which is angularly related to the flanks of the thread and which preferably intersects the flank of the thread at a location radially inwardly of the pitch diameter of the external locking thread.

The novel external locking thread convolution of the present invention provides a high locking power when applied to a mating internal standard thread, is not particularly sensitive to tolerance variations, and develops the high locking power with little or no tendency to jam or seize.

The present invention also provides a new and improved externally threaded locking fastener having a plurality of screw threads along a portion of its length for freely engaging an internally threaded member having a standard thread therein and a plurality of locking thread convolutions at its trailing end which interfere with the standard threads on the internally threaded member to produce a locking action, the locking threads having a recess space between adjacent threads thereof which is greater in an axial plane than that defined by the triangle between adjacent convolutions and which preferably extends to a depth which is greater than the minimum minor diameter for the standard thread of the same theoretical thread form for freely mating with the threads on the internally threaded member for freely accommodating metal swaged by the interfering threads so that the seizure between the externally threaded fastener and the internally threaded member does not occur when the former is applied thereto.

The present invention further provides a new and improved externally threaded locking fastener, as defined in the preceding paragraph, and wherein the locking threads or convolutions have the same thread angle as the theoretical basic form for the thread convolutions and a flank width which is wider than that of the basic thread form, preferably a flank width within Class 5 thread standards, to provide uniform interference on the flanks thereof when applied to the internally threaded member and wherein the recess space between adjacent locking threads preferably extends deeper than the apex of the triangle between the flanks of the adjacent threads.

The present invention still further provides a new and improved externally threaded locking fastener, as defined in the next preceding paragraph, and wherein the locking threads have a major diameter which is less than the minimum major diameter for the standard thread derived from the same theoretical basic thread form to provide clearance space between the crests of the locking threads and the root of the standard internal threads for freely accommodating metal swaged by the interfering threads so that seizure between the external locking threads and the internally threaded member does not occur when the former is applied thereto.

The present invention further provides a new and improved externally threaded locking fastener in accordance with any of the preceding paragraphs wherein the bottom of the recess has a generally semicircular cross sectional configuration.

Another disadvantage of the Class 5 thread is that in order to produce the thread by a thread rolling operation with rolling dies, it is necessary to use a cylindrical blank which has a diameter which is greater than the diameter of the standard blank used for forming a standard thread, such as a Class 2A thread, derived from the same theoretical thread form. This is especially disadvantageous when an externally threaded fastener, such as a bolt, is to be produced having a plurality of standard threads at its leading end and a plurality of Class 5 threads at its trailing end because a stepped blank having a portion whose diameter is of a non-standard size is necessary in order to produce the two different threads by a thread rolling operation. This has resulted in greater costs of production and in greater production time, since the dies and the stepped blank must be accurately aligned if a smooth transition between the standard and Class 5 threads is to be effected.

By providing an external locking thread convolution of the present invention, a standard, constant diameter size blank used for rolling standard threads can be employed and thus, rapid and economical production of the externally threaded locking fasteners is achieved.

The present invention also provides a new and improved method for making an externally threaded locking fastener of the character described above from a cylindrical blank of a standard and uniform diameter used for rolling standard threads, and which includes the step of rolling the blank with a die means having first die threads or teeth for forming a first plurality of standard thread convolutions on the leading end of the blank and second die threads or teeth shaped so as to form a second plurality of locking threads on the blank which have a flank width which is greater than that for the standard thread of the same theoretical basic thread form, a major diameter which is less than the minimum major diameter for the standard thread and a recess space between adjacent threads which is greater than the triangle formed between the adjacent flanks of the adjacent locking threads.

Other objects, novel characteristics and advantages of the present invention will be apparent in the following detailed description and in the accompanying drawings forming a part of this specification, and in which similar reference numerals designate corresponding parts throughout the several views of the drawings and in which.

The present invention provides a novel external locking thread or convolution which deviates from the theoretical basic form of the thread in certain particulars to provide an improved locking action when applied to a mating or standard internal thread. The locking thread convolution will provide a high locking power, is not particularly sensitive to tolerance variations and develops a high locking power with little or no tendency to jam when applied to the mating or standard internal thread. The locking action is obtained by making the threads of the convolution wider than that provided for the theoretical basic thread form for the standard thread, and preferably of a width within the tolerance limitations for a standard Class 5 interference-fit thread, to provide a uniform interference along the flanks thereof when applied to a standard internal mating thread.

To prevent or substantially minimize any tendency for any jamming action to occur when the external locking thread is applied to a mating internal standard thread, the major diameter of the locking thread convolution is made less than the minimum major diameter of the standard thread convolution to provide a clearance space between the crests of the locking thread convolution and the root of the standard mating internal thread to freely accommodate any elastic and/or plastic increase in the outside diameter of the locking thread and/or any metal swaged due to the thread interference. Additionally, a recess space between the adjacent threads of the locking thread convolution is provided which is larger in an axial plane than the recess space defined by the triangle between the adjacent threads thereof to provide a clearance space which freely accommodates any elastic and/or plastic decrease in the minor diameter of the internal threads and/or any metal swaged by the interfering threads. Although the depth of the recess space between the adjacent threads of the locking thread convolution can be varied depending upon the relative hardnesses of the materials of the internally threaded member and the locking thread convolution, the depth of the recess space is such that the bottom or root thereof is located radially inwardly of the minimum minor diameter of the standard internal thread, and preferably the recess extends deeper than the sharp root of the basic thread form and preferably has sides which extend generally radially of the axes of the locking thread convolution and intersect the flanks thereof at a location at or radially inwardly of the pitch diameter of the locking thread convolution.

The bottom of the recess is advantageously filleted at a juncture between the the bottom of the recess and sidewall portions of recess. The fillets substantially increase the service life of the threaded member by reducing stress concentrations. In one embodiment of the invention the radius of the fillets is such as to provide the bottom of the recess with a generally semicircular configuration which minimizes stress concentrations.

The basic theoretical design or form for a thread or thread convolution generally provides for a truncation of a fundamental triangle of the thread convolution to provide a flat between adjacent threads at the base of the threads. This flat lies along the surface of an imaginary cylinder coaxial with the thread convolution. For example, in the basic thread design for a conventional 60° included flank angle screw thread set forth in the National Bureau of Standards Handbook H28(1957) entitled "Screw Thread Standards for Federal Services", published by the U. S. Department of Commerce, the basic length of the flat between adjacent threads in an axial plane of an external thread convolution is given by the formula ⅛ P, where a P is a pitch of a thread. In accordance with the established standards for an external thread convolution, the truncations of the fundamental triangle may occur from a maximum in which the base length of the flat is ⅛ P to a minimum such as the base length of the flat is 1/24 P. The flat between adjacent threads in an axial plane will lie along what is referred to as the minor diameter in an external thread convolution and the minimum minor diameter permitted by the established standards would occur when the base length of a flat is 1/24 P.

In accordance with the preferred embodiment of the present invention, the basic thread angle of the thread convolution is maintained, the thread angle being the included angle defined in an axial plane by the converging sides of the flanks of the thread convolution, but the width of the thread convolutions between the flanks is uniformly wider than the maximum width for a standard thread of the same basic thread form so as to provide a uniform depth of interference along the flanks of the thread convolution when applied to a standard internal mating thread, and the major diameter is less than the maximum major diameter for the standard thread of the same basic thread form. The external thread convolutions preferably have an increased flank width and a reduced major diameter as compared to that of the standard thread, such as a Class 2A thread, which is in accordance with Class 5 thread standards, as set forth in "American Standard Class 5 Interference-Fit Thread" USA Standard 12,1963 published by the American Society of Mechanical Engineers.

Also the recess space between the adjacent threads of the external locking thread convolution is preferably larger in an axial plane than the space defined by the triangle between the flanks of the adjacent threads and preferably has side walls which extend generally radially of the axis of the locking thread convolution and which intersect the flanks of the threads at a radial location which is at or radially inwardly of the pitch diameter of the external locking threads, the radial extent of the generally radially extending side walls being at least one half but not greater than 12 times the distance, as measured axially, between the adjacent facing side walls. The recess space preferably extends to a depth which is greater than the minimum minor diameter for the standard thread and preferably deeper than the sharp root for the theoretical basic thread form. The junctions at the intersections of the side walls and bottom are filleted to reduce stress concentrations. In one embodiment of the invention which has particularly advantageous dynamic axial load bearing characteristics, the fillets intersect so that the bottom has a generally semicircular cross sectional configuration.

The above described thread construction enables a high locking interference to be effected and the extent of the locking interference to be readily controlled. This construction also enables a high locking power to be effected with little or no tendency to jam or seize, since sufficient clearance space is provided between the crests of the external locking threads and the root of the standard internal mating thread and the crests of the standard internal mating thread and the root of the external locking thread to freely accommodate any metal which is swaged.

Although the novel external locking thread convolution of the present invention could be used on various members or provided fasteners to provide a locking action with a cooperating internally threaded member or nut, it is particularly useful for externally threaded fasteners, and is herein shown as embodied in a bolt 10. The bolt 10 is usable in conjunction with internally threaded fastening members, such as a nut 11, provided with standard screw threads or convolutions 12 of the theoretical basic thread form, such as the screw thread standard set forth in the aforementioned National Bureau of Standards Handbook H28.

Figure 3:
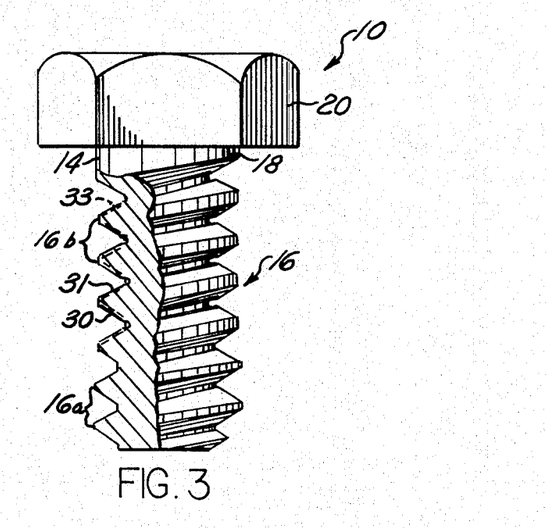
FIG. 3 is a fragmentary part axial cross-sectional part elevational view of a lock bolt illustrating one embodiment of the present invention.

Referring to FIG. 3 of the drawings, the lock bolt 10 is there shown as comprising a metal body 14 having a screw thread 16 formed on its outer side wall 18. The lock bolt 10 is provided with a head 20 at its trailing end and the screw thread 16 extends from its leading end toward the head 20.

Figure 4:
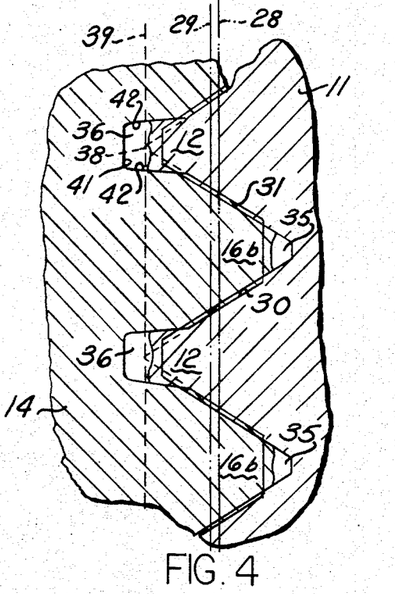
FIG. 4 is an enlarged fragmentary axial cross-sectional view showing the lock bolt of FIG. 3 engaged in an internally threaded member provided with standard threads.

The screw thread 16 formed on the outer side wall 18 of the metal body 14 comprises a plurality of fully formed, free running screw threads 16a which are adapted to freely run in or engage the standard threads 12 on the internally threaded member 11, see FIG. 4, and a plurality of undistorted, locking thread convolutions 16b which are adapted to interfere with the standard threads 12 on the internally threaded member 11 to produce a locking action therebetween.

The threads 16a define a continuous free running thread portion which extends from or adjacent the leading end along the outer side 18 for a portion of the length of the metal body 14 and terminates at a location spaced from the head 20 of the lock bolt 10. The threads 16a are standard thread convolutions, such as Class 2A threads, derived from the theoretical basic thread form so as to have a free running engagement with the standard threads 12 on the internally threaded member 11 when applied thereto. The standard thread convolutions 16a are preferably of the type set forth in the aforementioned National Bureau of Standards Handbook H28.

The screw thread convolutions or threads 16b form a continuation or extension of the threads 16a and define a continuous interfering locking thread portion which extends along the remaining portion of the side wall 18 of the metal body 12. The locking threads 16b deviate from standard threads of the theoretical basic thread form in that they have a pitch diameter, as indicated by the phantom line 28 in FIG. 4, which is greater than the maximum pitch diameter of the standard internal threads of the basic thread form or the threads 16a, the latter pitch diameter being indicated by the phantom line 29. The threads 16b are here shown as having planar leading and trailing flanks 30 and 31, respectively, which have the same flank angle as the leading and trailing flanks of the threads 16a and the threads 16b have an axially extending width at any given radial location which is greater than the corresponding maximum width within established tolerance limits for a standard thread, such as a Class 2A thread, derived from the same basic thread form or the threads 16a, as indicated by the dotted lines 33 on the thread convolutions 16b in FIG. 3. The pitch diameter and hence the extent of the increased flank width of the threads 16b is preferably within the tolerance limits for a Class 5 thread, as set forth in the aforementioned USA Standard B1. 12.

The locking threads 16b further deviate from standard threads of the theoretical basic form in that they have a major diameter which is less than the minimum major diameter for the standard thread or the threads 16a, the major diameter of the threads 16b being preferably within the tolerance limits for a standard Class 5 thread, as set forth in the aforementioned USA Standard B1. 12. The thread convolutions 16b also deviate from the standard thread of the basic thread form in that they have a minor diameter which is less than the minimum minor diameter of the standard internal threads 12 and preferably a minor diameter which is less than the minimum diameter for the standard threads or the threads 16a.

The external locking screw threads 16b of the screw thread 16 define a continuous interfering locking thread portion of the lock bolt 10 which interferes with the threads 12 on the internally threaded member 11 to produce a locking action therebetween and effect a swaging of metal when the bolt 10 is screwed into the internally threaded member 11. Since the screw threads 16b have a pitch diameter which is greater than the maximum pitch diameter of the standard screw threads, the width of the recesses between the adjacent threads 16b is less than the width between the side flanks of the standard threads 12 on the internally threaded member 11. Therefore, when the standard threads 12 on the internally threaded member 11 engage the threads 16b on the bolt 10 they interfere with each other, as indicated in FIG. 4 by the double cross hatched areas, and cause metal to be swaged. Since the flank angle for the locking thread 16b is the same as that for the standard thread 12 in the internally threaded member 11, the locking threads 16b have a uniform depth of interference along their thread flanks.

If the lock bolt 10 is of a harder material than that of the internally threaded member 11, the major portion of the metal which is swaged due to the thread interference will be swaged from the threads 12 of the internally threaded member 11 and flow into cavities or recesses 35 and 36 respectively extending radially outwardly and inwardly from the crests of the threads 16b.

If the lock bolt 10 is of a softer material than that of the internally threaded member 12, a major portion of the metal which is swaged due to the thread interference will be swaged from the threads 16b of a lock bolt 10 and flow into the recesses 35, 36.

The recesses 35 for receiving swaged metal are defined by the clearance space provided between the crests of the threads 16b of the lock bolt 10 and the root or bottom or the threads 12 on the internally threaded member 11. Since the threads 16b has the major diameter which is less than the minimum major diameter of the standard threads a relatively large clearance space 35 is provided which is sufficient to freely accommodate any and all metal swaged thereinto.

The recesses 36 for receiving swaged metal are larger in an axial plane than the recess space defined by the triangle between the adjacent threads 16b, i.e., the triangle whose sides are coplanar with the flanks 30 and 31 and whose apex is the projected point of intersection of the flanks, as indicated by reference numeral 38. The recesses 36, in the preferred embodiment extend radially inwardly to a depth which is greater than the depth defined by the minimum minor diameter for a standard thread of the same basic thread, as indicated by the dotted line 39 in FIG. 4, and preferably to a depth greater than the apex 38. The recesses 36 have a substantially flat bottom 41 and opposite side wall portions 42 which extend generally radially of the axis of the bolt 10 from the bottom 41 and intersect the flanks 30, 31 of the adjacent threads 16b at a location radially inwardly of or at the pitch diameter of the threads 16b. The side wall portions 42 are preferably slightly tapered so as to be slightly outwardly divergent proceeding from the bottom 41 toward their point of intersection with the flanks 30, 31. The point of intersection between the side wall portions 42 and the flanks 30, 31 is preferably at a location radially outwardly of the crests of the standard threads 12 on the internally threaded member 11, as best shown in FIG. 4. In view of the above, it should also be apparent that the volume of the recess space 36 between the adjacent threads for one pitch length of the thread is greater than the volume of the recess space of the triangle between the threads 16b for one pitch length of the thread.

From the foregoing, it should be apparent that the recesses 36 provide a clearance space extending radially inwardly from the crest of the standard internal threads 12 on the internally threaded member 11 which is substantially larger in an axial plane than the maximum clearance space extending radially inwardly of the crest of the threads 12 provided by the recess space between the threads 16a so that metal swaged from the threads 16b is freely accommodated or received in the recesses 36 to insure that seizure between the lock bolt 10 and the internally threaded member 11 due to insufficient clearance space for the swaged metal will not occur. By providing generally radially extending side walls 42 for the recesses 36 that preferably intersect the flanks of the threads 16b at a location radially inwardly of the pitch diameter thereof, metal is swaged from the flanks of the threads 16b along their entire extent to insure that maximum locking action is achieved. This latter provision also insures that free access to the recesses 36 is provided for the swaged metal.

It should also be pointed out that the major diameter of the locking threads 16b will increase and the minor diameter of the internal mating threads 12 will tend to decrease due to elastic and/or plastic deformation, the extent of the increase, if any, being dependent upon the relative hardness of the materials and the type of materials employed for making the lock bolt 10 and the internally threaded member 11.

From the construction of the embodiment of the lock bolt 10 as shown in FIGS. 3 and 4 in the drawings and described above, it can be seen that the threads 16a provide for free running engagement with the threads 12 in the internally threaded member 11 and that gripping of the lock bolt 10 by the internally threaded member for producing a desired locking action is achieved by the thread flank interference between the threads 12 of the internally threaded member 11 and the threads 16b on the lock bolt 10. This locking action which is achieved between the lock bolt 10 and the internally threaded member 11 is very effective for preventing undesired loosening between the lock bolt 10 and the member 11. The provision of the cavities or recesses 35 and 36 permits this type of thread interference locking action to be achieved without causing seizure between the lock bolt 10 and the internally threaded member 11 and will permit unscrewing therebetween as well as reapplication thereof.

It can be further seen that by employing the novel lock bolt 10 of the present invention that a thread flank interference type locking action can be achieved within standard Class 5 thread tolerances without requiring that the threads of the internally threaded member 11 be further truncated, as is required under present day practice. This provides for more economical fastener assemblies since the lock bolt 10 can be used with internally threaded members having mating or standard threads.

Figure 5:
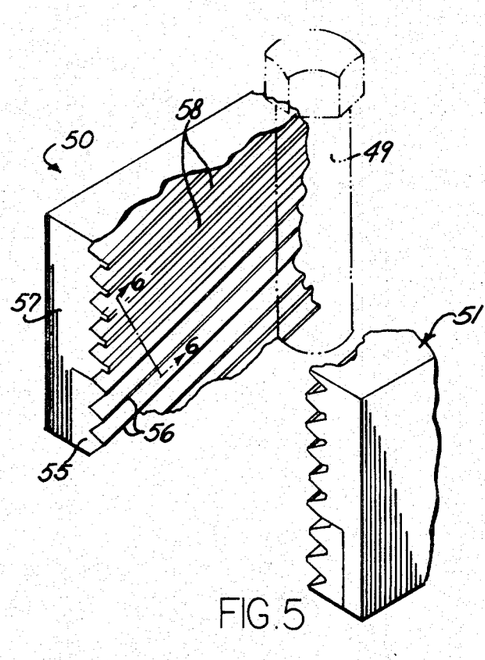
FIG. 5 is a fragmentary isometric view of a pair of dies used for rolling the thread on the bolt shown in FIG. 3.

The present invention also provides a novel method for making the lock bolt 10. The method, in general, comprises rolling a standard size cylindrical blank 49 between a pair of rolling dies 50, 51 having a first section for forming the free running threads 16a and a second section for forming the locking threads 16b. It is to be understood that a standard size blank is a constant diameter blank having a diameter which closely corresponds to the pitch diameter, within tolerance limitations, for rolling a standard thread of a theoretical basic thread form, such as a Class 2A thread.

Figure 6:
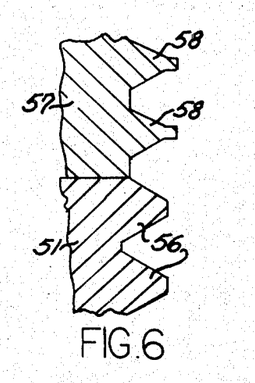
FIG. 6 is an enlarged cross-sectional view taken approximately along line 6—6 of FIG. 5.

The rolling dies 50, 51 are here shown as being flat-faced composite dies, and since both dies 50, 51 are of an identical construction, only the die 50 will be described in detail. The die 50 comprises a first die section 55 having a plurality of generally diagonally-extending die teeth or threads 56 thereon of a standard shape so as to provide a standard rolled thread, such as the threads 16a. The die 50 has a second die section 57 provided with a plurality of generally diagonally extending die teeth or threads 58 shaped so as to provide the configuration for the locking threads 16b. To this end, the die teeth 58 of the die section 57 have a width between their flanks which is less than the width between the flanks of the die teeth 56 in the die section 55 for forming the standard threads 16a so that the threads 16b formed by the teeth 58 will have an increased width between their flanks. Also, as best shown in FIG. 6, the base of the teeth 58 is located to the right of the base of the teeth 56 for forming the threads 16a so that the major diameter of the formed threads will be less than that of the threads 16a and the outer or crest portion of the teeth 58 is located to the right of the crests of the teeth 56 for forming the standard threads 16 so as to provide the enlarged recesses 36 between the threads 16b. Although the die section 55 is shown in FIG. 5 as being a separate die section which is disposed within a recess in the die section 57 and suitably secured thereto, the die section 55 and die threads 56 could be formed integral with the die section and die threads 57 and 58.

The screw thread 16 is formed by positioning or feeding the blank 49 between the adjacent dies 50, 51 and the relatively linearly moving the dies 50, 51 to roll the screw thread 16, and in a manner well known to those skilled in the art.

An important aspect of the present invention is that the locking threads 16b which provide the thread flank interference-fit, preferably a Class 5 interference-fit, can be rolled from a standard size, uniform diameter cylindrical blank. Heretofore, in order to roll a screw thread having a plurality of free running standard threads and a plurality of locking threads which provide a Class 5 interference-fit, it was necessary to employ a stepped blank. This was because in order to obtain sufficient metal to form the increased flank width of the Class 5 threads, it was necessary to roll these threads on a blank portion having an increased diameter. However, by providing an enlarged recess between the adjacent locking threads, sufficient metal can be provided to form locking threads having a pitch diameter within the tolerance limitations of a Class 5 thread.

More specifically, it has been found that the volume of metal required to provide the increased flank width of the Class 5 thread over that of a standard thread when rolling a standard size blank can be displaced from the root of the thread by forming an enlarged recess thereat. Since the volume of metal required to provide the increased flank width for a Class 5 thread will vary in accordance with the thread flank length desired, the volumetric displacement of metal from and hence, the extent of the enlarged recess provided at the root of the threads will be varied.

The enlarged recess at the root of the Class 5 threads, in the embodiment of FIG. 4, is defined by a generally flat bottom 41 and generally radially, though slightly outwardly divergent, side walls 42 which intersect the flanks of the thread at a location radially inwardly of the pitch diameter of the thread. The width and depth of the recess at the root of the threads will vary in accordance with the thread flank length desired and the volume of metal required to produce the increased flank width of the Class 5 thread. The depth of the recess, as measured radially from the point of intersection of the side wall 42 and the flank and the bottom 41, preferably is at least as great as but no greater than six times the distance, as measured axially, between a radial plane passing through the center of the recess and a radial plane passing through the point of intersection of the side wall 42 with the flank of the thread, the latter distance being shown in FIG. 7 and designated by reference character $x$.

Figure 7:
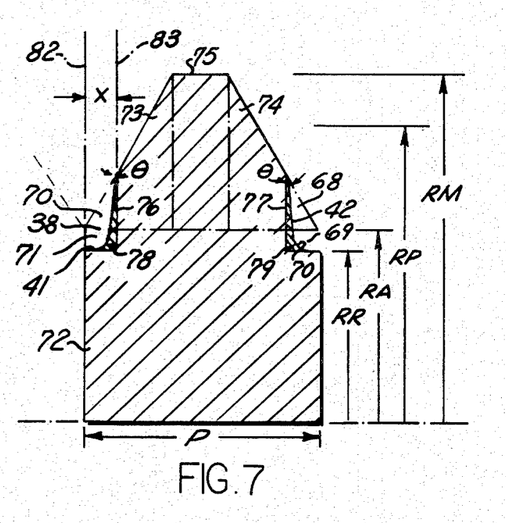
FIG. 7 is a diagrammatic axial cross-sectional view of one pitch length of a locking thread embodying the present invention.

It has been further found that the root radius RR to the bottom 41 of the recess for a given distance $x$ of the recess (which dimension governs the thread flank length), or vice versa, in order to provide the required volume of metal to be displaced to produce the Class 5 thread is governed by the formula:

$$[1 - \mathrm{Tan}\,\theta(\sqrt{3})]x^3 + [RA(\sqrt{3}) - 3(RR)\,(\mathrm{Tan}\,\theta)]x^2$$
$$+ [RA^2 - RR^2]x = \frac{RA^2(P)}{2} + \frac{(RM-RA)^2(2RA+RM)}{3\sqrt{3}}$$
$$+ \frac{(P\sqrt{3} - 2RM + 2RA)(RM^2 - RA^2)}{2\sqrt{3}}$$
$$+ 2\left[RR + \frac{(10-3\Pi)}{(4-\Pi)}\frac{(r)}{3}\right]\left[(r)^2\left(1 - \frac{\Pi}{4}\right)\right] - \frac{(d)^2 r}{8}$$

This is closely approximated by the formula:
$$x^3 + (RA\sqrt{3})x^2 + [RA^2 - RR^2]x$$
$$= \frac{RA^2(P)}{2} + \frac{(RM-RA)^2(2RA+RM)}{3\sqrt{3}}$$
$$+ \frac{(P\sqrt{3} - 2RM + 2RA)(RM^2 - RA^2)}{2\sqrt{3}} - \frac{(d)^2 P}{8}$$

where (see FIG. 7) RA is the radius to the projected apex 38 of the triangle between the threads:

RM is the major radius of the thread;

RR is the radius to the actual root or bottom 41 of the thread;

P is the pitch length of the thread;

d is the diameter of the cylindrical blank prior to forming the thread thereon, which diameter is equal to the pitch diameter of a standard thread of the same basic thread form;

$x$ is the distance, as measured axially, between a radial plane 82 passing through the apex 38 and the radial plane 83;

$\theta$ is the angle of taper of the sidewall 42, i.e. the relatively small included angle between the sidewall 42 and a radial plane 48 passing through the point of intersection between the sidewall portion 42 and the adjacent flank 30 or 31.

This is only an approximate formula for the volume displacement required since the volume of the fillet between the sidewalls 42 and bottom 41 of the thread and the volume resulting from the tapering of the sidewall 42 have been omitted for purposes of simplification of the formula. This omission introduces a relatively small error when the fillets are relatively small and when the sidewalls 42 have only a slight degree of taper. The formula is derived in the following manner. The volume $V_1$ of material of a standard size blank, such as a Class 2A blank, for one pitch length of the thread is given by the formula: $V_1 = (\pi d^2 P)/4$. The volume $V_2$ of material for one pitch length after the thread is formed is equal to the volume $V_1$ of material before the thread is formed, the volume $V_2$ being given by the formula: $V_2 = 2(\pi)(\overline{Y}A)$, which formula is Pappus's theorem of volume of revolution, and wherein $\overline{Y}$ is the distance from the axis of revolution to the centroid of the entire cross sectional area shown in FIG. 7 and A is the area thereof. Since $V_1 = V_2$ $$\frac{\pi(d)^2(P)}{4} = 2\pi(\overline{Y}A)$$

therefore, $$\frac{(d)^2(P)}{8} = \overline{Y}A$$

The distance from the axis of revolution to the centroid times the area ($\overline{Y}A$) is obtained in the following manner. The entire cross sectional area of FIG. 7 plus the blank areas 68–71 within the dotted lines are subdivided into geometric sections the geometric sections being indicated by the phantom lines in FIG. 7 and designated by reference numerals 72–75, and then the distance from the axis of revolution to the centroid and area of each section is calculated. Then the centroid distance and areas for the triangular and rectangular sections 68–71, as indicated by the dotted lines in FIG. 7 are calculated, assuming straight sidewalls 42 with no fillets between the sidewalls and bottom 41 of the thread.

The calculated centroids $\overline{y}$ and areas for each of the areas 68–71 is as follows:

| SECTION | AREA | $y$ |
|---|---|---|
| 72 | $+RA(P)$ | $RA/2$ |
| 73 | $+\frac{1}{2}(RM\text{-}RA)/\sqrt{3}(RM\text{-}RA)$ | $RA+\frac{1}{3}(RM\text{-}RA)$ |
| 74 | + SAME AS SS 73 | SAME AS SS 73 |
| 75 | $+\left[P-2\frac{(RM-RA)}{\sqrt{3}}\right](RM\text{-}RA)$ | $RA+\frac{1}{2}(RM\text{-}RA)$ |
| 68 | $-\frac{1}{2}(x)(x\sqrt{3})$ | $RA+\frac{1}{3}(x\sqrt{3})$ |
| 69 | $-x(RA\text{-}RR)$ | $RR+\frac{1}{2}(RA\text{-}RR)$ |
| 70 | – SAME AS SS 68 | SAME AS SS 68 |
| 71 | – SAME AS SS 69 | SAME AS SS 69 |

The area times the centroid distance ($\overline{y}a$) for each section is as follows:

| SECTION | ($\overline{y}a$) |
|---|---|
| 72 | $RA^2/2(P)$ |
| 73 | $\frac{1}{2}\left[\frac{(RM-RA)^2(2RA+RM)}{3\sqrt{3}}\right]$ |
| 74 | SAME AS SS 73 |
| 75 | $(P\sqrt{3}-2RM+2RA)(RM^2-RA^2)/2\sqrt{3})$ |
| 68 | $-\frac{1}{2}(RA\sqrt{3}x^2+x^3)$ |
| 69 | $\frac{1}{2}(RR^2-RA^2)x$ |
| 70 | – SAME AS SS 68 |
| 71 | SAME AS SS 69 |

$\overline{Y}A$ is equal to $(d^2p/8)$ which in turn is equal to the centroid times the area for sections 72–75 minus the summation of the centroid times the area for sections 68–71. Therefore, $$\overline{Y}A = \frac{d^2p}{8} = \epsilon(\overline{y})(a) = \frac{RA^2(P)}{2}$$
$$+ \frac{(RM-RA)^2(2RA+RM)}{3\sqrt{3}}$$
$$+ \frac{(P\sqrt{3}-2RM+2RA)(RM^2-RA^2)}{2\sqrt{3}}$$
$$-[RA\sqrt{3}]x^2 - x^3 + (RR^2-RA^2)x$$

Since the major radius $RM$, radius $RA$, pitch $P$, and diameter $d$ are either chosen or calculatable values, the variables left in the equation are $x$ and $RR$. Thus, for any given value or $RR$, the value of $x$ can then be approximately calculated, or vice versa.

When a more accurate determination of the volume of displacement is required or when the fillets have a substantial radius, the volume of metal to be displaced to produce a Class 5 thread is governed by the formula:

$$x^3 + RA\sqrt{3}x^2 + (RA^2-RR^2)x$$
$$= \frac{1}{(1-\sqrt{3}\tan\theta)}\left[\frac{RA^2(P)}{2}\right.$$
$$+ \frac{(RM-RA)^2(2RA+RM)}{3\sqrt{3}}$$
$$+ \frac{(\sqrt{3}P-2RM+2RA)(RM^2-RA^2)}{2\sqrt{3}}$$
$$+ R^2(.4292037-\tan\theta)(RR+.2233679R) - \frac{(d)^2P}{8}$$
$$\left. - \frac{\tan\theta}{3}[RA^3 - 3RR^2(RA) + 2RR^3]\right]$$

Where (see FIG. 7) $RA$ is the radius to the projected apex 38 of the triangle between the threads;
$RM$ is the major radius of the thread;
$RR$ is the radius to the actual root or bottom 41 of the thread;
$P$ is the pitch length of the thread;
$R$ is the radius of the fillet, if any, at the intersection of the side wall 42 and the bottom 41 of the thread;
$d$ is the diameter of the cylindrical blank prior to forming the thread thereon, which diameter is equal to the pitch diameter of a standard thread of the same basic thread form;
$\theta$ is the angle of taper of the side wall 42, i.e., the included angle between the side wall 42 and a radial plane 48 passing through the point of intersection between the side wall portion 42 and the adjacent flank 30 or 31; and
$x$ is the distance, as measured axially, between a radial plane 82 passing through the apex 38 and the radial plane 83.

This formula for the volume displacement required is derived in much the same manner as previously explained. The volume $V_2$ of material for one pitch length after the thread is formed is equal to the volume $V_1$ of material (which equals $(\pi d^2P/4)$ ) before the thread is formed, the volume $V_2$ being given by Pappus's theoremas: $V_2 = 2(\pi)(\overline{Y}A)$. Wherein $\overline{Y}$ is the distance from the axis of revolution to the centroid of the entire cross sectional area shown in FIG. 7 and A is the area thereof.

Since $V_1 = V_2$ $$(d)^2(P)/8 = \overline{Y}A$$

The distance from the axis of revolution to the centroid times the are ($\overline{Y}A$) is obtained in the following manner. As was previously explained, the entire cross sectional area of FIG. 7 plus the blank areas 68–71 within the dotted lines are subdivided into geometric sections the geometric sections being indicated by the phantom lines in FIG. 7 and designated by reference numerals 72–75, and then the distance from the axis of revolution to the centroid and area of each section is calculated. Then the centroid distance and area for the triangular and rectangular sections 68–71, as indicated by the dotted lines in FIG. 7 are calculated. Then the centroid distances and areas 76–79, associated with the fillets and tapered sidewalls 42 and defined by the double cross-hatched lines in FIG. 7, are calculated.

The calculated centroids $\overline{y}$ and areas for each of the areas 68–79 is as follows:

| SECTION | AREA | $y$ |
|---|---|---|
| 72 | $+RA(P)$ | $RA/2$ |
| 73 | $+\frac{1}{2}(RM\text{-}RA)/\sqrt{3}(RM\text{-}RA)$ | $RA+\frac{1}{3}(RMRA)$ |
| 74 | + SAME AS SS 73 | SAME AS SS 73 |
| 75 | $+\left[P-2\frac{(RM-RA)}{\sqrt{3}}\right](RM\text{-}RA)$ | $RA+\frac{1}{2}(RM\text{-}RA)$ |
| 68 | $-\frac{1}{2}(x)(x\sqrt{3})$ | $RA+\frac{1}{3}(x\sqrt{3})$ |
| 69 | $-x(RA\text{-}RR)$ | $RR+\frac{1}{2}(RA\text{-}RR)$ |

| | | |
|---|---|---|
| 70 | – SAME AS SS 68 | SAME AS SS 68 |
| 71 | – SAME AS SS 69 | SAME AS SS 69 |
| 76 | +($x \sqrt{3}+RA-RR$)$^2$tan$\theta$/2 | $RR+(x \sqrt{3}+RA-RR)/3$ |
| 77 | + SAME AS SS 76 | SAME AS SS 76 |
| 78 | + $R^2(1-\pi/4-\tan\theta/2)$ | $RR+(10-3\pi/4-\pi(R)/3$ |
| 79 | + SAME AS SS 78 | SAME AS SS 78 |

The area times the centroid distance ($\bar{y}a$) for each section is as follows:

| SECTION | ($ya$) |
|---|---|
| 72 | $RA^2/2(P)$ |
| 73 | $\frac{1}{2}\left[\frac{(RM-RA)^2 (2RA+RM)}{3\sqrt{3}}\right]$ |
| 74 | SAME AS SS 73 |
| 75 | $(P \sqrt{3}-2RM+2RA)(RM^2 - RA^2)/2\sqrt{3}$ |
| 68 | $-\frac{1}{2}(RA \sqrt{3} x^2 + x^3)$ |
| 69 | $\frac{1}{2}(RR^2 - RA^2) x$ |
| 70 | SAME AS SS 68 |
| 71 | SAME AS SS 69 |
| 76 | $(x \sqrt{3} + RA-RR)^2 \tan\theta/2 \left[RR+\frac{(x\sqrt{3}+RA-RR)}{3}\right]$ |
| 77 | SAME AS SS 76 |
| 78 | $R^2(1-\pi/4-\tan\theta/2)\left[RR+\frac{(10-3\pi)}{4-\pi}\frac{(R)}{3}\right]$ |
| 79 | SAME AS SS 78 |

$\bar{Y}A$ is equal to $d^2p/8$ which in turn is equal of the centroid times the area for sections 72–79 minus the summation of the centroid times the area for sections 68–71. Therefore, $$\bar{Y}A=\frac{d^2p}{8}=\Sigma(\bar{y})(a)=\frac{RA^2(p)}{2}$$
$$+\frac{(RM-RA)^2(2RA+RM)}{3\sqrt{3}}$$
$$+\frac{(P\sqrt{3}-2RM+2RA)(RM^2-RA^2)}{2\sqrt{3}}-(RA\sqrt{3})x^2-x^3$$
$$+(RR^2-RA^2)x+(x\sqrt{3}+RA-RR)^2\frac{\tan\theta}{3}$$
$$(2RR+x\sqrt{3})+RAR^2(.4292037-\tan\theta)$$
$$(RR+.2233679R)$$

Since the major radius $RM$, radius $RA$, pitch $P$, fillet radius $r$, diameter $d$ and the angle $\theta$ are either chosen or calculatable values, the variables left in the equation are $x$ and $RR$. Thus, for any given value of $RR$, the value of $x$ can then be quite accurately calculated.

If desired the centroids $\bar{y}$ and areas for the fillets can be calculated in a slightly different but equivalent manner so as to have the following values which are equivalent to those set forth above.

| Section | Area | $y$ |
|---|---|---|
| 76 | $+3/2 x^2 (\tan\theta)$ | $RR+(x \sqrt{3}/3$ |
| 77 | +SAME AS SS 76 | SAME AS SS 76 |
| 78 | $+r^2(1-\pi)/4$ | $RR+(10-3\pi)/4-\pi(r)/3$ |
| 79 | +SAME AS SS 78 | SAME AS SS 78 |

The area times the centroid ($\bar{y}a$) for each fillet area is then:

| Section | |
|---|---|
| 76 | $\frac{1}{2}[3 (RR)(\tan\theta) x^2 + \tan\theta \sqrt{3} x^3]$ |
| 77 | SAME AS SS 76 |
| 78 | $(RR (10-3\pi)/4-\pi(r)/3 (r^2(1-\pi)/4)$ |
| 79 | SAME AS SS 78 |

When the values of the centroid ($\bar{y}a$) for each fillet area is calculated in this manner:

$$\bar{Y}A=\frac{d^2p}{8}=\epsilon(\bar{y})(a)$$
$$=\frac{RA^2(P)}{2}+\frac{(RM-RA)^2(2RA+RM)}{3\sqrt{3}}$$
$$+\frac{(P\sqrt{3}-2RM-2RA)(RM^2-RA^2)}{2\sqrt{3}}-[RA\sqrt{3}]x^2-x^3$$
$$+(RR^2-RA^2)x+3(RR)(\tan\theta)x^2+\tan\theta\sqrt{3}x^3$$
$$+2\left[\left(RR+\frac{(10-3\Pi)}{4-\Pi}\right)\frac{(r)}{3}\right]\left[(r)^2\left(1-\frac{\Pi}{4}\right)\right]$$

Alternately the screw threads 16 for the lock bolt 10 could be formed by first rolling a continuous standard thread from a standard size blank along its entire length and then rolling a portion of the thread previously formed by employing a second, separate die means having teeth or threads thereon shaped so as to provide the locking thread convolution 16b. In such an operation the major diameter of the standard threads previously formed would be decreased and the recess space between the threads 16b provided during the second rolling operation. Conversely a standard size blank could be rolled having a continuous thread with the locking thread convolution 16b and subsequently rolled again at the point end of the thread to produce a standard 2A entering end thread. Further a band of locking thread convolutions 16b of desired length can be produced in the center of a threaded length by any of the methods disclosed, i.e., by a single or dual rolling operation.

It will, of course, be understood that the method of the present invention could be carried out by rotating dies on cylindrical die machines rather than by reciprocating a pair of flat composite dies, as shown in the drawings, if desired.

It should be pointed out that screw threads having the same thread form or profile as the helical screw threads 16a and 16b of the bolt 10 could be formed on a polygonal shaped blank by a thread rolling operation with suitably modified dies to provide a bolt having a plurality of free running threads and a plurality of locking threads for interfering with a standard thread of an internally threaded member. The locking threads formed on such a blank would function to provide a locking action with a standard internal thread in the same manner as that described for the locking threads 16b except that only circumferentially spaced portions, i.e., the portions at the corners of its polygonal body, would engage and interfere with the flanks of the standard internal thread. The major diameter of such locking threads would occur at the corner portions thereof and would be the same as the major diameter for the helical threads 16b.

Figure 8:
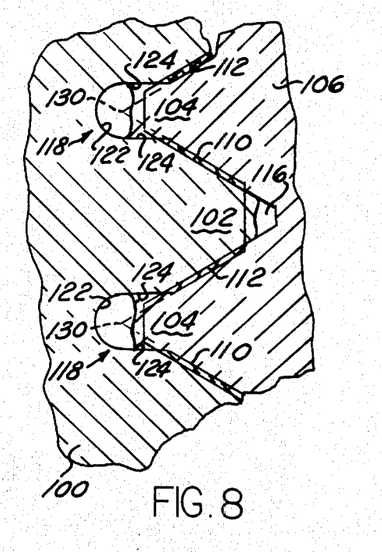
FIG. 8 is an enlarged fragmentary axial cross-sectional view showing another embodiment of the lock bolt engaged in an internally threaded socket member provided with standard threads.

FIG. 8 illustrates an embodiment of the locking thread wherein the bottom of the recess at the root of the locking thread has a generally semicircular cross sectional configuration which improves the service life of the bolt by minimizing stress concentrations at the bottom of the recess. Accordingly, a metal body 100 of a lock bolt, similar to the lock bolt 10 of FIG. 3, has a locking thread convolution 102 which defines a continuous locking thread portion which interferes with a screw thread or convolution 104 formed on a nut or socket 106. The thread 104 is similar to the thread 12 of FIG. 4 and is of the theoretical basic thread form, such as the screw thread standards set forth in the aforementioned National Bureau of Standards Handbook H28. The locking thread 102 is generally similar to the locking thread 16b of FIG. 4 and interferes with the screw thread 104 to provide locking engagement between the body 100 of the bolt and the nut or socket 106, in the manner previously explained.

The lock thread 102 deviates from the standard thread form in the same manner as does the lock thread 16b of FIG. 4. Thus, while the lock thread 102 has the same flank angle as a standard thread convolution, it has an axially extending width at a given radial location which is greater than the corresponding maximum width within established tolerance limits for a standard thread. In addition, the locking screw thread 102 has a pitch diameter which is greater than the maximum pitch diameter of standard thread and has a major diameter which is less than the minimum major diameter for a similar standard thread. The lock thread 102 also has a minor diameter which is less than the minimum minor diameter for a similar standard thread. As was previously explained in connection with the embodiment of the invention set forth in FIG. 4, this configuration of the lock thread 102 results in a uniform depth of interference between planar leading and trailing flanks 110 and 112 of the lock thread 102 and the mating flanks of the standard thread 104. This uniform depth of interference between the threads 102 and 104 produces a uniform locking action between the threads and squeezes metal into recesses 116 and 118 formed at the bottoms or roots of the threads 106 and 102 respectively.

The recesses 116 and 118 are similar to the recesses 35 and 36 of FIG. 4. However, the recess 118 of FIG. 8 has a bottom 122 with a continuous arcuate or semicircular cross sectional configuration which forms a smooth continuous junction with opposite side wall portions 124 of the recess to minimize stress concentrations. The side walls 124 of the recess 118 are slightly tapered so as to diverge outwardly from the bottom 122 and have a radial extent sufficient to give the recess 118 a depth which is at least as great but no greater than six times the distance, as measured axially, between a radial plane passing through the center of the recess and a radial plane passing through the point of intersection of the side walls 124 with the flanks 110 and 112 of the lock thread 102.

The embodiment of the invention illustrated in FIG. 8 is a special or particularly advantageous embodiment of the invention as illustrated in FIGS. 3–7. In the embodiment of FIG. 8, the bottom 122 of the recess 118 has been filleted with fillets having a radius, corresponding to the radius r of FIG. 7, which is equal to the axial distance between the side wall 124, the flank of the locking thread 102 and a radial plane passing through an apex 130 of the standard thread 104. Thus, the embodiment of the invention illustrated in FIG. 8 is a special case of the embodiment illustrated in FIGS. 3–7 wherein the radii r of the fillets are almost equal to the distance $x$. While the radii of the fillets closely approach the distance $x$ in the embodiment of FIG. 8, the previously mentioned outward tapering of the side walls 124 prevents the radii from being exactly equal to the distance $x$. Therefore, the distance between a radial plane passing through the center of the recess and a radial plane passing through the point of the intersection between the side wall portion and the adjacent flank of the thread for a given root radius of the recess, or vice versa, in order to provide the required volume of metal to be displaced is governed by the formuli previously set forth in connection with FIG. 7. However, since radii of the fillets are relatively large, the second formula gives a more accurate calculation of the displacement than the first formula. Of course, in the embodiment of the invention illustrated in FIG. 8, the distance $r$ in the formula will be approximately equal to the distance $x$.

By experimentation it has been determined that when the recess 118 has a generally semicircular cross sectional configuration, that is when the distance r is almost equal to the distance $x$, the locking bolt has a relatively long service life which is apparently the result of a minimization of stress concentrations. Of course, the fillets of the embodiment of FIGS. 4 and 7 provide smooth continuous junctions between the bottom of the recess 36 of FIG. 7 and the radially extending side wall portions of the recess and thereby tend to reduce stress concentrations. However, by providing the fillets with a radius closely approaching one half of the axial width of the recesses 118, the fillets intersect to provide a generally semicircular cross sectional configuration for the bottom 122 of the recess 118 which apparently minimizes stress concentrations.

From the foregoing drawings and detailed description it will now be readily recognized that this invention provides a novel external locking thread convolution which deviates from the theoretical basic form of the thread in a particular manner to provide an improved thread flank interference type locking action, preferably a Class 5 type interference locking fit, when applied to a mating internally threaded member and without causing seizure between the interfering threads thereof. If will also be seen that the present invention provides a novel lock bolt which is of a simple and economical construction and which can be made by a thread rolling operation on a standard size blank used for rolling a standard thread.

Although the subject matter of the present invention has been illustrated and described herein to a somewhat detailed extent, it will be understood, of course, that the invention is not to be regarded as being limited in scope but includes all changes and modifications coming within the terms of the claims hereof.

Having described a specific preferred embodiment of the invention, the following is claimed:

1. A bolt comprising a head portion and a body portion extending axially outwardly from said head portion and having a longitudinally extending central axis, said body portion including a shank of a given diameter connected to said head portion, an external locking thread convolution rolled on said body portion outwardly of said shank and having a plurality of turns adapted to interfere with a standard internal thread convolution, said external locking thread convolution having a longitudinally extending central axis which is coincident with the longitudinally extending central axis of said body portion, and a standard external thread convolution rolled on said body portion outwardly of said locking thread convolution and adapted to mate with the standard internal thread convolution, said standard external thread convolution and said locking thread convolution being formed as a continuous external thread by rolling a blank having a uniform diameter equal to the given diameter of said shank, said bolt having a volume of material for one pitch length and turn of said locking thread convolution which is equal to the volume of material of said bolt for one pitch length and turn of said standard external thread convolution, said locking thread convolution having a thread angle and pitch which are the same as the thread angle and pitch of said standard external thread convolution and a metal width between its flanks which is greater than the maximum metal width between the flanks of the standard external thread convolution to provide uniform interference with the standard mating internal thread convolution, said locking thread convolution having a pitch diameter which is greater than the pitch diameter of said standard internal thread convolution and a major diameter which is less than the minimum major diameter of said standard external thread convolution to provide clearance space between the crest of said locking thread convolution and the root of the standard internal thread convolution freely accommodating metal swaged due to the interference between said standard internal thread convolution and said locking thread convolution, said locking thread convolution having a minor diameter which is less than the minor diameter of said standard external thread convolution to provide a recess space between adjacent turns of said locking thread convolution which is larger in an axial plane than the space defined by a recess triangle between adjacent turns and having sides coplanar with flanks of the adjacent turns of said locking thread convolution, said recess space having a bottom located inwardly of an imaginary apex of the recess triangle and side walls extending generally radially outwardly from said bottom of said recess to intersect the flanks of said locking thread convolution at locations inwardly of the pitch diameter of said standard external thread convolution, said recess space having a configuration in accordance with the following formula whereby the depth of said recess space and the distance between the generally radial side walls are of such dimensions as to provide for the displacement of sufficient metal to form said locking thread convolution upon a rolling of a blank having a uniform diameter equal to the diameter of said shank:

$$x^3 + RA\sqrt{3}x^2 + (RA^2 - RR^2)x$$
$$= \frac{1}{(1-\sqrt{3}\tan\theta)} \left[ \frac{RA^2(P)}{2} + \frac{(RM-RA)^2(2RA+RM)}{3\sqrt{3}} \right.$$
$$+ \frac{(\sqrt{3}P - 2RM + 2RA)(RM^2 - RA^2)}{2\sqrt{3}}$$
$$+ R^2(.4292037 - \tan\theta)(RR + .2233679R) - \frac{(d)^2 P}{8}$$
$$\left. - \frac{\tan\theta}{3}[RA^3 - 3RR^2(RA) + 2RR^3] \right]$$

where P is the pitch of said locking thread convolution and said standard external thread convolution, RA is the radius from the central axis of said locking thread convolution to the imaginary apex of the recess triangle defined by the adjacent flanks of the adjacent turns of said locking thread convolution, RR is the root radius from the central axis of said locking thread convolution to the bottom of the recess between the adjacent turns of said locking thread convolution and is equal to one half of the minor diameter of the locking thread convolution, RM is the radius from the central axis of said locking thread convolution to the crest of said locking thread convolution, $\theta$ is the included angle, if any, between said side walls of said recess and a radial plane passing through the point of intersection of said side walls and the flanks of the locking thread convolution, x is the axial distance between the radial planes passing through the apex of the recess triangle and the point of intersection between the side walls and the flank of said locking thread convolution, d is the diameter of the cylindrical blank prior to rolling said thread thereon, and R is the radius of fillets, if any, at the intersections between the generally radially extending side walls and the bottom of said recess.

2. A bolt as set forth in claim 1 wherein the radius R is substantially equal to the axial distance x.

3. A bolt as set forth in claim 1 wherein said standard external thread has a pitch diameter which is substantially equal to the diameter d of the cylindrical blank and the diameter of said shank.

4. A fastener having an external thread comprising a standard thread convolution and a locking thread convolution rolled on a blank having a longitudinally extending central axis and a uniform diameter, said locking thread convolution having a longitudinally extending central axis which is coincident with the longitudinally extending central axis of said blank, said standard external thread convolution being adapted to mate with a standard internal thread convolution and said rolled locking thread convolution having a plurality of turns adapted to interfere with said standard internal thread convolution and forming a continuation of said standard external thread convolution, said fastener having a volume of material for one pitch length and turn of said locking thread convolution which is equal to the volume of material of said fastener for one pitch length and turn of said standard external thread convolution, said locking thread convolution having a thread angle which is the same as that for said standard external thread convolution and a metal width between its flanks which is greater than the maximum width for said standard external thread convolution to provide uniform interference with the standard mating internal thread convolution along the flanks of said locking thread convolution, said locking thread convolution having a pitch diameter which is greater than the pitch diameter of said standard internal thread convolution and a major diameter which is less than the minimum major diameter of said standard external thread convolution to provide clearance space between the crests of said locking thread convolution and the root of the standard internal thread convolution for freely accommodating metal swaged due to the interference between said standard internal thread convolution and said locking thread convolution, said locking thread convolution having a recess space between adjacent turns thereof which is larger in an axial plane than the space defined by a triangle between the adjacent turns and having sides coplanar with flanks of the adjacent turns of said locking thread convolution, said recess space having a volume which corresponds to the volume of metal which must be displaced to effect the forming of said locking thread convolution during the rolling of said locking thread convolution on the blank, said recess having side walls extending generally radially from a bottom of said recess to intersect flanks of said locking thread convolution at locations inwardly of the pitch diameter of said standard external thread convolution and having a configuration in accordance with the following formula:

$$x^3 + RA\sqrt{3}x^2 + (RA^2 - RR^2)x$$
$$= \frac{1}{(1-\sqrt{3}\tan\theta)}\left[\frac{RA^2(P)}{2} + \frac{(RM-RA)^2(2RA+RM)}{3\sqrt{3}}\right.$$
$$+ \frac{(\sqrt{3}P - 2RM + 2RA)(RM^2 - RA^2)}{2\sqrt{3}}$$
$$+ R^2(.4292037 - \tan\theta)(RR + .2233679R) - \frac{(d)^2P}{8}$$
$$\left. - \frac{\tan\theta}{3}[RA^3 - 3RR^2(RA) + 2RR^3]\right]$$

where P is the pitch of said locking thread convolution and said standard external thread convolution, RA is the radius from the central axis of said locking thread convolution to an imaginary apex of the recess triangle defined by the adjacent flanks of the adjacent turns of said locking thread convolution, RR is the root radius from the central axis of said locking thread convolution to the bottom of the recess between the adjacent turns of said locking thread convolution and is equal to one half of the minor diameter of the locking thread convolution, RM is the radius from the central axis of said locking thread convolution to the crest of said locking thread convolution, $\theta$ is the included angle, if any, between said side walls of said recess and a radial plane passing through the point of intersection of said side walls and the flanks of the locking thread convolution, x is the axial distance between the radial planes passing through the apex of the recess triangle and the point of intersection between the side wall portion and the flank of said locking thread convolution, d is the diameter of the cylindrical blank prior to rolling said external thread thereon, and R is the radius of fillets, if any, at the intersections between the generally radially extending side walls and the bottom of said recess.

5. A fastener as set forth in claim 4 wherein the radial extent of said side walls is no greater than six times the axial distance x.

6. A fastener as set forth in claim 4 wherein said bottom has a generally semicircular cross-sectional configuration.

7. A fastener as set fourth in claim 4 wherein the root radius RR is less than the root radius of said standard external thread convolution, 8. A bolt comprising a head portion and a body portion extending axially outwardly from said head portion and having a longitudinally extending central axis, an external locking thread convolution rolled on said body portion and having a plurality of turns adapted to interfere with a standard internal thread convolution, said external locking thread convolution having a longitudinally extending central axis which is coincident with the longitudinally extending central axis of said body portion, and a standard external thread convolution rolled on said body portion outwardly of said locking thread convolution and adapted to mate with the standard internal thread convolution, said standard external thread convolution and said locking thread convolution being formed as a continuous external thread by rolling a blank having a uniform diameter, said bolt having a volume of material for one pitch length and turn of said locking thread convolution which is equal to the volume of material of said bolt for one pitch length and turn of said standard external thread convolution, said locking thread convolution having a metal width between its flanks which is greater than the maximum width between the flanks of the standard external thread convolution to provide interference with the standard mating internal thread convolution, said locking thread convolution having a major diameter which is less than the minimum major diameter of said standard external thread convolution to provide clearance space between the crest of said locking thread convolution and the root of the standard internal thread convolution for freely accommodating metal swaged due to the interference between said standard internal thread convolution and said locking thread convolution, said locking thread convolution having a minor diameter which is less than the minor diameter of said standard external thread convolution to provide a recess space between the root of adjacent turns of said locking thread convolution and the crest of the standard internal thread convolution which is larger in an axial plane than a space between the root of adjacent turns of said standard external thread convolution and the crest of the standard internal thread convolution and such that said recess space between adjacent turns of said locking thread convolution has a bottom located inwardly of the root of said standard external thread convolution to provide for the displacement of sufficient metal to form said locking thread convolutions upon a rolling of a blank having a uniform diameter, said recess space between adjacent turns of said locking thread convolution being in accordance with the following formula:

$$x^3 + RA\sqrt{3}x^2 + (RA^2 - RR^2)x = \frac{1}{(1-\sqrt{3}\tan\theta)}$$
$$= \left[\frac{RA^2(P)}{2} + \frac{(RM-RA)^2(2RA+RM)}{3\sqrt{3}}\right.$$
$$+ \frac{(\sqrt{3}P - 2RM + 2RA)(RM^2 - RA^2)}{2\sqrt{3}}$$
$$+ R^2(.4292037 - \tan\theta)(RR + .2233679R)$$
$$\left. - \frac{(d)^2P}{8} - \frac{\tan\theta}{3}[RA^3 - 3RR^2(RA) + 2RR^3]\right]$$

where P is the pitch of said locking thread convolution and said standard external thread convolution, RA is the radius from the central axis of said locking thread convolution to the imaginary apex of a recess triangle defined by the adjacent flanks of adjacent turns of said locking thread convolution, RR is the root radius from the central axis of said locking thread convolution to the bottom of the recess between the adjacent turns of said locking thread convolution and is equal to one half of the minor diameter of the locking thread convolution, RM is the radius from the central axis of said locking thread convolution to the crest of said locking thread convolution, $\theta$ is the included angle, if any, between side walls of said recess and a radial plane passing through the point of intersection of said side walls and the flanks of the locking thread convolution, $x$ is the axial distance between the radial planes passing through the apex of the recess triangle and the point of intersection between the side walls and the flank of said locking thread convolution, $d$ is the diameter of the cylindrical blank prior to rolling said thread thereon, and R is the radius of fillets, if any, at the intersections between the generally radially extending side walls and the bottom of said recess.

* * * * *